July 4, 1961   J. L. RILEY   2,990,869
PNEUMATIC TIRES
Filed Jan. 26, 1959   3 Sheets-Sheet 1

JOSEPH L. RILEY
INVENTOR.

BY
*Loyal H. McCarthy*
ATTORNEY

July 4, 1961 J. L. RILEY 2,990,869
PNEUMATIC TIRES
Filed Jan. 26, 1959 3 Sheets-Sheet 2

JOSEPH L. RILEY
INVENTOR.

BY

ATTORNEY

July 4, 1961 J. L. RILEY 2,990,869
PNEUMATIC TIRES
Filed Jan. 26, 1959 3 Sheets-Sheet 3

INVENTOR
JOSEPH L. RILEY

BY *Loyal H. McCarthy*

ATTORNEY

United States Patent Office 2,990,869
Patented July 4, 1961

2,990,869
PNEUMATIC TIRES
Joseph L. Riley, 14109 SE. Fair Oaks Drive,
Portland, Oreg.
Filed Jan. 26, 1959, Ser. No. 788,934
25 Claims. (Cl. 152—339)

My invention relates to improvements principally in tubeless type pneumatic tires for use with either commercial or non-commercial type vehicles, having self-contained power units and drive means, although it may be used effectively, in some of its modifications, as a tube-type tire or on vehicles not containing their own power or drive units. It further relates to providing a low-profile tire in conjunction with comparatively large tread areas for use on vehicles employed in heavy moving or construction jobs of various kinds, as well as on light commercial or passenger vehicles. Surface loading factors, driving torque transference to ground, or surface factors and available wheel diameters for braking systems are some of the main problems confronting tire and wheel designs for modern motor driven vehicles. These factors and their interrelation have had definite bearings on tire designs, sizes and diameters and on wheel diameters which in turn exert a definite influence on brake systems and designs. My invention enables obtaining desirable results relative to ground loading factors and torque transference to ground factors without sacrificing and further minimizing wheel diameters and circumferential areas available for braking installations.

One object of my invention, therefore, is to provide a tire unit combining the usual construction features of pneumatic tires with a low-profile height.

Another object of my invention is to provide a low-profile tire which incorporates comparatively great surface contacting areas and which, also, incorporates one or more central reinforcing elements inside the tire between the side walls and radially inward from the surface contacting treaded portions thereof.

A further object of my invention is to provide a low-profile pneumatic tire incorporating one or more tread divisions medially of the sidewalls thereof, preferably immediately outward radially from the central reinforcing members, thereby providing any such tire with two or more distinct treaded areas on the bearing surface thereof.

A still further object of my invention is to provide a tire of conventional rim bead and sidewall construction containing one or more central reinforcing members disposed inside the tire radially inward from the ground bearing portions thereof, which central reinforcing members may extend to and contact the rim upon which said tire is mounted without forming an air seal at the point of contact, such tire incorporating holes through the central reinforcing members for ready equalization of pressure between the compartments of the tire.

A still further object of my invention is to provide a low-profile pneumatic tire having its tread design in one continuous treaded pattern transversely thereof without lateral divisions and having one or more central reinforcing members within said tire which will contact the rim upon which the same is mounted at the inner extremities of the central reinforcing members in such a manner as to form an air-tight seal between the various compartments and which will have one or more small holes through the central reinforcing members in order to prevent rapid exhaustion of air simultaneously from all compartments of the tire in the event one or more compartments should be blown out or severely damaged.

A further object of my invention is to provide a tire of the character described which will enable obtaining greater application of available torque to the ground and greater ground bearing surfaces without sacrificing wheel diameters and circumferential areas available for braking mechanisms.

Still another object of my invention is to provide a heavy equipment tire that will be sturdier and less susceptible to breakage at the transitional area from sidewall to tread portions and that will not be as susceptible to picking up large rocks, debris, etc., as conventional multiple wheel and tire equipment in current use.

A further and additional object of my invention is to provide a tire of otherwise conventional construction which will better control tire distortions due to high speeds, turning, lateral pressures, load pressures, etc.

Still another, further and additional object of my invention is to provide a single unit tire of the character hereinabove revealed which may be made in extreme widths, heretofore impractical or impossible, to replace duals or multiple units of tires on existing equipment and for newly manufactured equipment.

Other and further objects of my invention will be apparent from the specification and claims hereinafter set forth.

Referring to the drawings.

Figure 10:
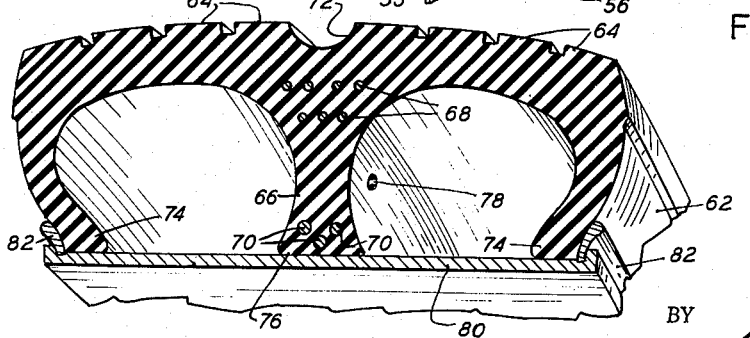

FIG. 10 is a detailed, sectional, elevational view on an enlarged scale, showing a further modification of the low-profile tire incorporating a central reinforcing member which bears and seals upon its mounting rim. This modification shows a small hole through the central reinforcing member, representative of air passage elements designed, proportioned and arranged to prevent the rapid escape of air from one compartment to another in the event of a blowout or serious damage to a portion of the tire.

Figure 8:
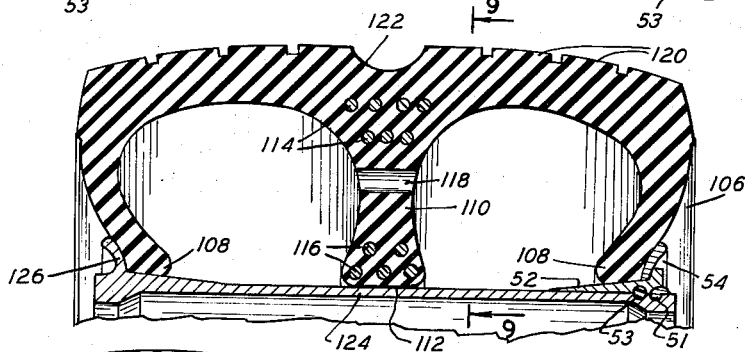
FIG. 8 is a sectional detail view on an enlarged scale of another design of my invention, showing a central reinforcing member, which extends to the surface of the rim upon which said tire is mounted and which does not form an air-tight seal with said rim, showing one of the plurality of air passage holes through the central reinforcing member.
Figure 11:
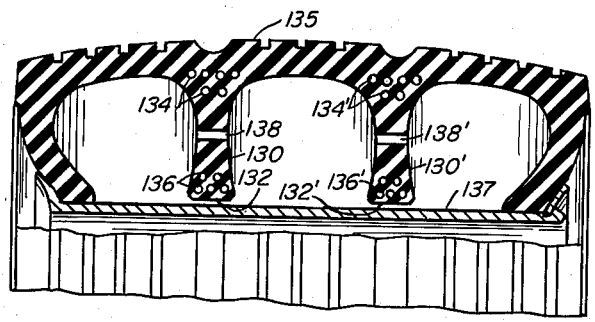

FIG. 11 is a fragmentary elevational sectional view in detail on an enlarged scale of a low profile tire modification of the version shown in FIG. 8, showing a plurality of central reinforcing members terminating at a point slightly above the rim line.

Figure 12:
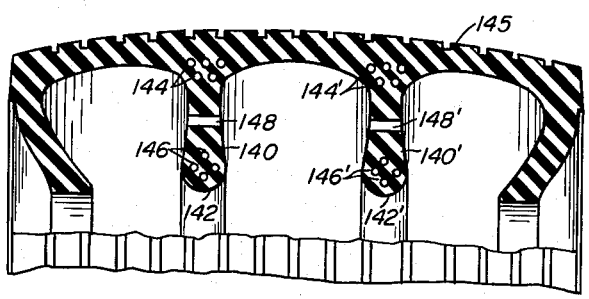

FIG. 12 is a fragmentary elevational sectional view in detail on an enlarged scale of the modification of a low profile tire variation shown in FIG. 8, showing a plurality of central reinforcing members terminating in convexly curved lower ends at a point slightly above the rim line.

Figure 13:
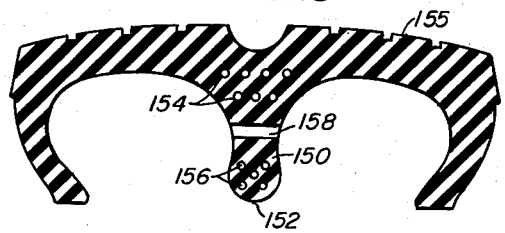

FIG. 13 is an end elevational view in detail on an enlarged scale of a modification of the low profile tire shown in FIG. 8, showing a single central reinforcing member terminating in a convexly curved lower end at a point slightly above the rim line.

Figure 14:
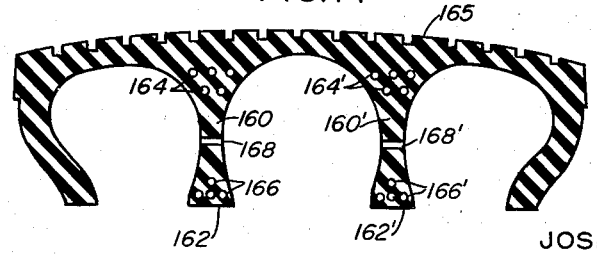

FIG. 14 is a detailed sectional elevational view on an enlarged scale of another modification of the low profile tire shown in FIG. 10 of the drawings, showing multiple central reinforcing members, the lower ends of which bear and seal upon the rim and showing an air passage element in each central reinforcing member so designed and arranged to prevent the rapid escape of air from one compartment to another.

Referring further to the drawings:

An approximation of the profile height, diametrical or radial thickness from rim bead to tread, of a conventional passenger or light commercial vehicle tire 20 is shown in dotted lines in comparison with the low-profile, diametrical or radial thickness from rim bead to tread, of my tire 22, which incorporates, comparative to tread width, lessened height or thickness radially from rim bead to tread than the conventional tire it replaces. The improved tire 22, hereinafter referred to as a low-profile tire, in all its modifications, contemplates any tread design 24 which will be substantially wider than that of the conventional tire 20, due to the non-circular cross-section of said tire which enables a flatter tread across a point of greater lateral tire diameter without using greatly increased amounts of rubber, or the like, as would be required by the conventional type tire. This widened tread factor enables greater load bearing qualities on soft earth, or unstable surfaces, than would be possible with the conventional tire due to the greatly increased number of square inches of tire surface contacting the ground. The low-profile tire may be in all other respects of conventional tire constructions, having reinforced bead edges 26, the bead reinforcing elements, such as wire, etc., not being shown in the drawings, fabric layers and rubber layers, etc. Centrally of the sidewalls of the low-profile tire and structurally inscribed (used in the geometric sense relative to solid objects) on the inner surface thereof, and preferably, though not necessarily, an integral part of the tire carcass construction, is positioned a reinforcing member 28 formed into the tire construction and has embedded in it reinforcing elements 30 of metal, nylon, or other suitable material. The reinforcing member 28 forms a complete circumferential member at the inner surface of the low-profile tire. The elements 30 are laterally spaced apart in parallel relationship to each other in the same plane medially of and for the circumference of the reinforcing member 28. The tire 22, as in the case of a conventional tire 20, can be used with a conventional drop center type rim 32, or with any other known and suitable type of rim, of a diameter complementary to that of the tire bead without any changes or modifications in the rim being necessary.

The low-profile tire 22 may have its tread 24 divided into two distinct tread pattern areas circumscribing the tire 22 and laterally spaced apart by a groove 38 preferably positioned concentrically outwardly from the central reinforcing member. It may have the reinforcing elements 36 spaced apart and arranged concentrically in the same vertical plane and medially of said member 34, the reinforcing member 44 with reinforcing elements 46 medially thereof in spaced parallel relation, or the reinforcing member 58 with reinforcing elements 60 medially thereof in spaced parallel relation. The reinforcing elements 36, 46 and 60 may be of any desired shape and more than one cross-sectional size within their respective reinforcing members; and they are arranged in different relationships to each other and to their respective reinforcing members to indicate some of the modifications which may be incorporated into the low-profile tire, within the spirit and scope of the invention, to attain necessary or desirable strength and resistance to deformations and damage caused by load and weight factors, lateral stresses, tortion, speed, abrasion, heat and temperature factors, etc.

Figure 2:
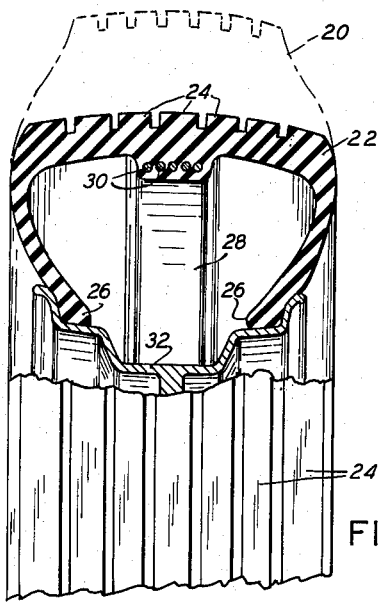
FIG. 2 is a detailed front elevation view in partial section in the direction of the arrows along line 2—2 of FIG. 1 and on an enlarged scale of the tire and rim shown in FIG. 1, the dotted lines indicating a relative approximation of the profile height of a conventional tire to the profile height of my tire, indicated by solid lines.
Figure 1:
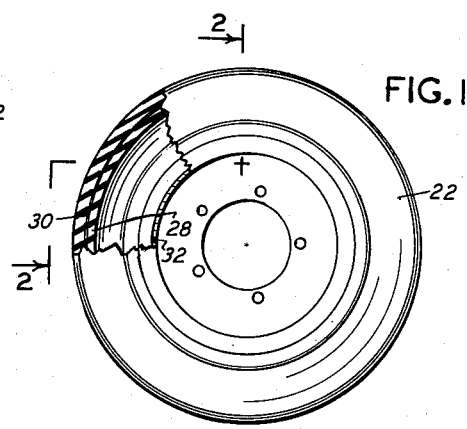
FIG. 1 is a side view of one form of my tire mounted upon a conventional drop-center, passenger car type rim with a portion of said tire and rim broken away.
Figure 3:
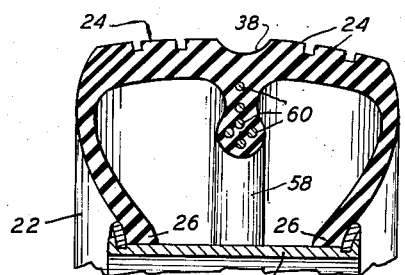
FIG. 3 is a sectional detail view on an enlarged scale, showing a variation in design form of the central reinforcing member and of the tread of my tire, said tire being mounted on a flat center rim similar to those used on many commercial-type vehicles.
Figure 4:
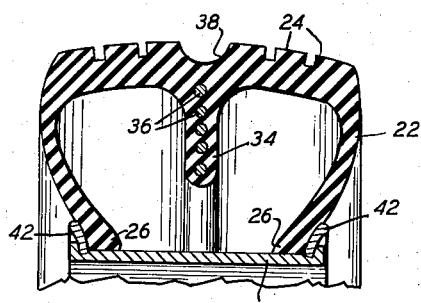
FIG. 4 is a sectional detail view on an enlarged scale of another variation in design form of the central reinforcing member of my tire.
Figure 5:
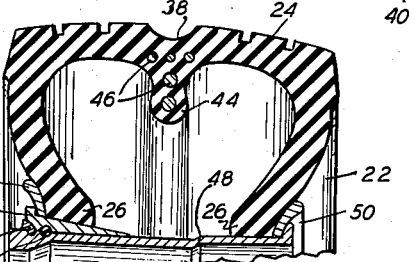
FIG. 5 is a sectional detail view on an enlarged scale, showing another modification of the central reinforcing member, said tire being mounted on another design of a commonly used commercial-type rim.

As shown in FIGS. 3 and 4, modifications of the low-profile tire 22 are mounted upon a flat rim 40, the beads 26 of the tire 22 being retained thereon by snap rings 42 at each edge of rim 40. FIG. 5 of the drawings shows a single wheel and tire arrangement type of low-profile tire mounted upon a rim 56, having a snap ring 50 at one edge thereof, with its surface offset at 48 to provide clearance for facilitating the mounting of tires, a wedge rim element 52 at its other edge to take up the clearance effected by the offset at 48, a snap ring 54 positioned on said wedge rim 52, an O ring 53, which is an air sealing gasket, positioned between the rim 56 and the wedge rim element 52, and a snap ring 51 to retain said wedge rim 52 in position.

Figure 6:
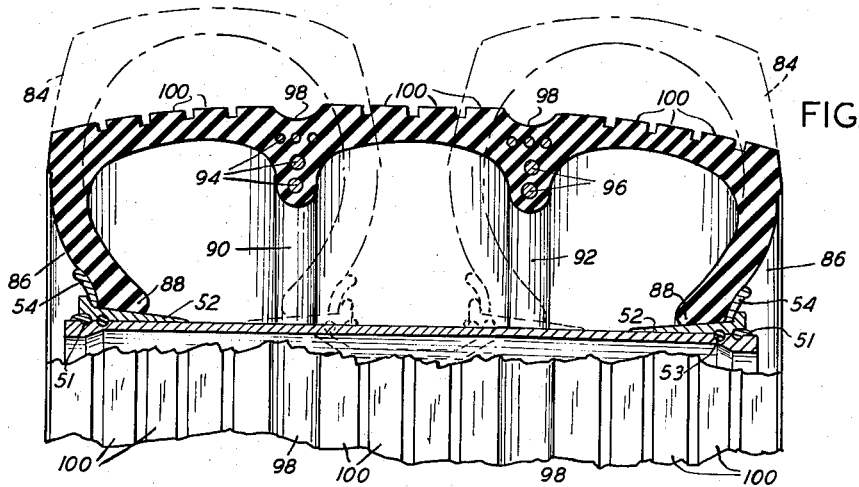
FIG. 6 is a detailed elevational view on an enlarged scale, showing one form of design which incorporates more than one central reinforcing member, said tire being mounted upon a rim designed to replace the dual rims and tires of present equipment. The dotted lines of this view indicate, comparative to my invention, an approximation of the conventional dual tire, rim and spacer set-ups now in use.

A heavy equipment low-profile tire 86 is designed to replace the conventional dual tire arrangement 84 indicated by the broken lines in FIG. 6 of the drawings. As in the case of a passenger car or light commercial vehicle low-profile tire 20, the heavy equipment tire 86 also incorporates the features of less height radially from beads 88 to tread 100 together with the substantially wider transverse width relative to radial height and the flatter cross-sectional surface bearing portion than in conventional type tires. The tire 86 is provided with a plurality of central reinforcing members 90 and 92. Reinforcing elements 94 and 96 of any suitable material such as metal, nylon, etc., are embedded within the structure of the reinforcing members 90 and 92, respectively, and may be arranged in any suitable relationship to each other and to their respective reinforcing members in order to satisfactorily control the stresses and strains to which a tire would be subjected. As shown in FIG. 6 of the drawings, two large reinforcing elements 94 and 96 are arranged concentrically in the same plane beneath three smaller reinforcing elements 94 which are arranged in lateral spaced relation to each other in the same plane within their respective reinforcing members 90 and 92. As in the case of the passenger or light commercial tire 20, the construction of the tire 86 and its bead portions 88 could be of any conventional and known design including the standard reinforcing cables within the bead elements 88. The tire 86 may be mounted on any known and conventional type of rim used in conventional heavy equipment such as those indicated in FIGS. 6, 7, 8 and 10 of the drawings or on any special rim employed to adapt the wheels of existing equipment to the usage of one low-profile tire in lieu of more than one conventional tire. The width of the particular rim design employed and of the low-profile tire 86 would be modified to the demands of the particular piece of equipment upon which the same were to be mounted. FIGS. 6, 7, 8 and 10 illustrate the width of rim and tire which are intended to replace conventional dual equipment. However, this width factor may be varied, without departing from the spirit of this invention, to replace more than two tires in any one particular application, such as in the case of certain low boy trailers and heavy equipment which may have several tires positioned in lateral arrangement along one axis line. The number of central reinforcing members 90 and 92 in such a tire would be varied in accordance with the width and strength factors required in any given tire 86.

Figure 7:
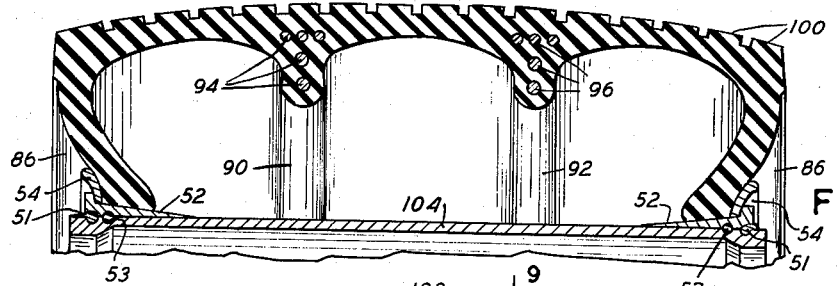
FIG. 7 is a detailed sectional elevational view on an enlarged scale of my tire, having a plurality of central reinforcing members and a continuous transverse tread design from side wall to side wall.

As shown in FIG. 6 of the drawings, the heavy equipment type low-profile tire 86 is provided with a tread 100 which is separated into multiple tread units circumscribing the tire and laterally spaced apart by grooves 98. The grooves 98 are preferably positioned immediately above the central reinforcing members 90 and 92 for this purpose. The tire 86 may be provided with one continuous tread pattern 100 from side wall to side wall, as shown in FIG. 7 of the drawings. The low-profile tire in FIGS. 6 and 7 is shown in the drawings as being mounted upon a flat rim 104 incorporating wedge rims 52, air sealing O rings 53, tire retaining snap rings 54, and wedge rim retaining snap rings 51 at each lateral edge thereof.

Figure 9:
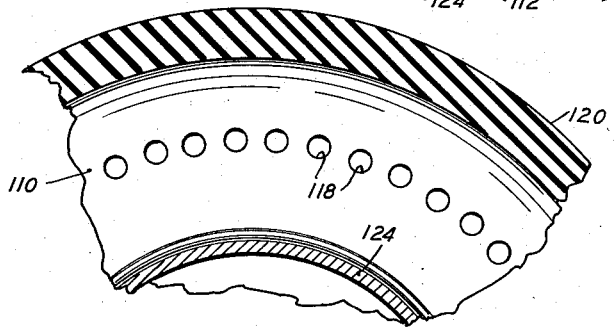
FIG. 9 is a fragmentary, elevational, sectional view in detail and on an enlarged scale of a low-profile tire modification, taken in the direction of the arrows along line 9—9 of FIG. 8, showing a plurailty of air passage holes through the central reinforcing member.

FIGS. 8 and 9 show a low-profile tire 106 which may be modified in width to be suitable for use on passenger and light commercial vehicles or for use on heavy equipment. The tire 106, as in the case of the passenger tires and heavy equipment tires hereinabove described, is of any known and conventional tire construction and is provided with conventional type beads 108 containing reinforcing cables therein, not shown in the drawings. This tire may be provided with a plurality of circumscribing tread patterns 120 separated laterally by a groove, or grooves, 122, located preferably above a central reinforcing and divider member 110; or it may have a continuous tread pattern from side wall to side wall. The central reinforcing and divider member 110 of the tire 106 is formed into the tire construction midway between the side walls thereof, in the event only two compartments are to be formed therein, or spaced at equidistant intervals from the adjacent side wall or other and adjacent central reinforcing and divider members 110, in the event that a tire of more than two compartments is to be formed. The central reinforcing and divider member 110 has embedded therein at its upper portion reinforcing elements 114 of any suitable material such as metal, nylon, etc. The reinforcing elements 114 may consist of any desired number, shape and size and may be arranged in any desired or necessary relationship to each other in order to effectively control the various stresses and strains to which the tire may be subjected. The central reinforcing and divider member 110 extends downwardly within the tire a sufficient distance to effect the contact of the lowermost edge 112 thereof with the rim 124 upon which it is mounted at a point medially of the sides thereof. The rim-contacting edge 112 of the said reinforcing and divider member is, also, provided with reinforcing elements 116 which may be of any desired or necessary number, size, shape and material to effectively strengthen the tire. The elements 116 may, also, be arranged in any desired relationship to each other within the lowermost portion of the central reinforcing and divider member 110. A plurality of air passage elements, such as holes, 118 are positioned through the central reinforcing and divider member 110 medially of the reinforcing elements 114 and 116. The holes 118, or their equivalent, allow for and facilitate ready equalization of air pressure in the various compartments of the tire 106. In this tire the rim-contacting edge 112 of the central reinforcing and divider member 110 is not an air-tight seal. However, under certain load conditions air pressure equalization between the various compartments might be impeded if air passages 118 were not provided medially of the central reinforcing and divider member 110. The modification of my low-profile tire, as indicated by the tire 106, is provided with multiple circumferential tread patterns 120 spaced apart laterally by a groove, or grooves, 122. However, the tread pattern 120 may be continuous from side wall to side wall, if desired. As shown in FIG. 8, the tire is mounted upon a rim 124 incorporating as an integral part thereof a fixed bead retaining edge 126 on one side thereof. The opposite side is provided with a wedge rim element 52, an air seal O ring gasket 53, a tire retaining snap ring 54, and a wedge rim retaining snap ring 51, as described hereinabove in connection with other forms of the low-profile tire.

The low-profile tire 62, as shown in FIG. 10 of the drawings, incorporates a central reinforcing and divider member 66 extending down to and making firm contact with the rim 80 at its lower edge 76. In this variation of the low-profile tire the edge 76 of the central reinforcing and divider member 66 forms an air-tight seal with the rim 80. One or more small air passages 78, shown as a hole in the drawings, are provided through the central reinforcing and divider member 66 for the purpose of preventing rapid exhaustion of air from compartments of the tire in the event one or more compartments should be blown out or severely damaged. The number, size and location of the elements 78 would be such as to adequately safeguard against exhaustion of all air from and flattening of the tire occurring too rapidly. The central reinforcing and divider member 66 of the modification 62 of the low-profile tire is, also, provided with one or more reinforcing elements 68 built into the construction of the tire at the upper portion of said central reinforcing and divider member. The elements 68 may be of any suitable material, metal, nylon, etc., and may be of any size, shape, number and arrangement to effectively control the stresses and strains to which the tire would be subjected. In the lower portion of the central reinforcing and divider member 66 above the rim-contacting and air-sealing edge 76, but below the air passages 78, are positioned a plurality of reinforcing elements 70. The elements 70 are embedded and constructed within the lower portion of the central reinforcing and divider member 66 and may be of any suitable material, shape, size, number and arrangement to control effectively the tire and the stresses and strains to which it may be subjected.

The tire 62, as shown in FIG. 10, is provided with dual tread patterns 64 laterally spaced apart by means of groove 72 which is positioned preferably directly above the reinforcing and divider member 66 within the tire. However, as in the case of any of the other low-profile tire modifications hereinabove described, more than one groove or a continuous tread pattern from sidewall to sidewall may be provided. As in the case of the tire 106 and its central reinforcing and divider member 110, the tire 62 may be provided with more than one central reinforcing and divider member 66. The number of said central reinforcing and divider members 66 would be determined by the width of the tire, the particular usages in which it was employed, and the loads, stresses, strains, distortions, etc. to which it could be expected to be subjected. The rim 80 upon which the tire 62 is shown as being mounted in FIG. 10 of the drawings is flat from side to side and is provided at each edge with a snap ring 82 for lateral retention of the beads 74 of the tire.

Another modification of the tire, as shown in FIG. 11, is a variation of the version shown in FIG. 8. This modification incorporates a plurality of reinforcing and divider members 130 and 130′ integral with the inner peripheral surface of the surface-bearing portion, 135. The reinforcing and divider members 130 and 130′ are spaced apart from each other and from the sidewalls of the tire. The reinforcing and divider element 130 is provided with an air passage hole 138, and the reinforcing and divider element 130′ is provided with a corresponding or similar air passage hole 138′. The lower edges 132 and 132′, respectively, of said reinforcing and divider members 130 and 130′ extend radially inwardly from the surface-bearing portion 135 to a point slightly above the inner peripheral margin of the sidewalls of the tire so as to leave a slight space between the edges 132 and 132' and a rim upon which the tire may be mounted, such as 137. The upper portions of said central reinforcing and divider members 130 and 130' are provided, respectively, with a plurality of parallel reinforcing elements 134 and 134', respectively, arranged in any suitable or desirable relationship to each other. Likewise, the lower portions of the central reinforcing and divider members 130 and 130' are respectively provided with a plurality of reinforcing elements 136 and 136' arranged in any suitable or desirable relationship to each other.

A further variation of the modification of the tire shown in FIG. 8 is best seen in FIG. 12 and incorporates a plurality of central reinforcing and divider members 140 and 140' spaced apart from each other and from said sidewalls and so arranged and designed as to extend radially inward from the surface-bearing portion 145 of said tire to a point slightly above the inner peripheral margins of the sidewalls of the tire, thereby disposing the lower ends 142 and 142', respectively, of said central reinforcing and divider members 140 and 140' slightly above the rim line when the adjacent surface-bearing portion 145 of the tire is not bearing a load. The lower ends 142 and 142' of the central reinforcing and divider members are convexly curved so as to facilitate rolling slightly on the rim when a load is applied to the surface-bearing portion 145 of the tire, such as its bearing upon the ground. Each of the central reinforcing and divider members 140 and 140' are provided with a plurality of reinforcing elements 144 and 144', respectively, in the upper portions thereof, said plurality of parallel reinforcing elements disposed in any suitable and desirable arrangement. Likewise, each of the central reinforcing and divider members 140 and 140' may be provided with a plurality of parallel reinforcing elements 146 and 146', respectively, disposed in any suitable and desirable arrangement in the lower portion thereof. Air passage holes, 148 and 148', are provided, respectively, in the reinforcing and divider elements 140 and 140'. Said air passage holes are preferably disposed medially between the upper and lower reinforcing elements in each of said reinforcing divider members.

Another variation of the modification of the tire shown in FIG. 8 is best seen in FIG. 13. This variation incorporates only one central reinforcing and divider element 150 extending radially inward from the surface-bearing portion 155 of the tire. The reinforcing and divider element 150 has a convexly curved lower edge 152 which extends to a point slightly radially outward from the inner peripheral edges of the sidewalls of the tire. As in the modification having a plurality of reinforcing and divider walls convexly curved at their lower edges, the curved edge 152 is designed to roll slightly as the tire compresses. A plurality of parallel reinforcing elements 154 may be disposed in any suitable or desirable arrangement in the upper portion of the central reinforcing and divider member 150, and likewise a plurality of parallel reinforcing elements 156, disposed in any suitable or desirable arrangement, are positioned in the lower portion of said reinforcing divider wall 150. An air passage hole 158 through the central reinforcing and divider member is disposed medially of said groups of reinforcing elements 154 and 156.

Another modification of the low-profile tire in FIG. 10 is best seen in FIG. 14. This modification incorporates a plurality of central reinforcing and divider walls such as 160 and 160' extending radially inward from the surface-bearing portion 165 of the tire, said central reinforcing and divider walls extending radially inward to the plane of the inner peripheral edges of the sidewalls of said tire. Each of the central reinforcing and divider walls 160 and 160' is provided with an air sealing edge 162 and 162', respectively. A plurality of parallel reinforcing elements 164 and 164', respectively, are provided in the upper portion of the central reinforcing and divider walls 160 and 160', respectively. The lower portion of each of said reinforcing and divider walls 160 and 160' is further provided with a plurality of parallel reinforcing elements 166 and 166', respectively. The elements of the groups of parallel reinforcing elements 164, 164', 166 and 166', may be arranged in any suitable or desirable disposition relative to each other within any group. The central reinforcing and divider walls 160 and 160' may be flexible and also may be, but need not be, provided, respectively, with restrictive air passage holes 168 and 168'. The restrictive air passage holes are designed to operate in a manner to prevent rapid exhaustion of air from the tire, or any compartments thereof, in the event one or more compartments should be severely damaged or blown out.

Any of the modifications of the low-profile tire, or any combination thereof, could incorporate the usual and known construction features, elements and techniques such as reinforcing cables or metal, etc. in the tire beads, fabric plies, rubber layers, etc. Also in FIGS. 8 and 10, or the modifications thereof, elements 68 and 114 or 70 and 116, etc., may be omitted, if desired. Furthermore, in the event that it would be considered economically advantageous for adapting existing equipment to the use of the low-profile tire without disrupting power to weight features, etc., incorporated in any such equipment, the over all wheel diameters would be maintained by designing the low-profile tire to such dimensions that outside wheel diameters and rim diameters on existing equipment would be unchanged. However, the low-profile tire for this purpose would incorporate the flattened, non-circular cross-section, the transversely flattened tread areas and the substantially greater surface contacting areas obtained by greatly increasing the transverse width of the tire in comparison with radial height thereof over and above that incorporated in the conventional tire it would replace. Any of the low-profile tires, whether an original design for new equipment or replacement designs for existing equipment, through the incorporation of the flatter tread areas, the non-circular cross-sectional shape obtained and the strengthening thereof accomplished through the incorporation of reinforcing elements imbedded in the structure of the central reinforcing members would also include transitional areas from tire sidewalls to surface contacting, or tread, portions which are sturdier than the conventional tire, and hence less susceptible to damage and breakage through abrasions, etc. By providing one low-profile tire unit which would replace multiple wheel units and by breaking the tread patterns into a series of parallel and laterally spaced apart designs, any of the advantages which might be gained from multiple wheel equipment could be retained. The disadvantages, such as picking up of large stones and debris between units of multiple wheel equipment, would be eliminated, for the grooves between the tread patterns would not be deep enough to grip, retain, and later throw any such objects.

It is understood in the case of modifications of low-profile tires incorporating central reinforcing and divider members which depend downwardly to points of contact with, or close proximity to, the rims on which they may be mounted, slight modification of the central reinforcing and divider members, such as elimination of the air passage holes 78 and 18, for example, will readily enable the use of inner tubes within each of the compartments of any such tire, if desired. However, the low-profile tire is primarily designed for use as a tubeless tire. In the application of the low-profile tire employing a non-sealing type or central reinforcing and divider member 110, the rim contacting edge 112 of said member 110 may be convexly curved in cross-sectional shape at this edge. Also, the construction of the central reinforcing and divider member 110 may be such as to allow for flexing of the same under weight and load conditions, etc. Consequently, as the result of weight and load factors, etc., any slight relative diametric changes which might occur therein, between the outer circumferences of the tire and the central reinforcing and divider member and that of the rim-contacting edge 112 would be automatically compensated for by a slight flexing and rolling of the central reinforcing and divider member. In the case of the central reinforcing and divider member 66 with the air-tight seal between its edge 76 and the rim upon which it is seated said central reinforcing and divider member would have incorporated therein sufficient flexing qualities to compensate for the slight degree of flattening or diametrical differential between the outer and rim contacting circumferences thereof that could occur under load and weight conditions, etc.

It is understood that one or more variations of the modifications of the low-profile tire described herein may be substituted for, or combined with, those of any other modification of the tire within the spirit and scope of the invention. It is further understood that the disclosures herein set forth are merely preferred embodiments of my invention, that other variations or modifications are feasible without departing from the spirit and scope thereof, and that I am not limiting myself to the specific, preferred embodiments described herein.

Having thus described my invention, I claim:

1. A tubeless, pneumatic tire consisting of the combination of: two sidewalls in spaced relation; a rim-contacting bead at the inner circumferential margin of each sidewall; reinforcing elements embedded in each of said beads; a surface-bearing portion having inner and outer peripheral surfaces, disposed transversely between and as a continuation of said sidewalls at their outer circumferential margins, said transversely disposed surface-bearing portion being of great transverse width relative to the radial height of said sidewalls from bead to outer circumferential margin and forming at its inner peripheral surface a non-circular cross-sectional shape with said sidewalls; a central reinforcing member fixedly positioned medially of said surface-bearing portion between said sidewalls, extending radially inward from said transversely disposed surface-bearing portion to a point radially outward from said rim-contacting beads; and a plurality of reinforcing elements in spaced relationship to each other embedded in and coursing throughout the circumferential length of said central reinforcing member.

2. A tubeless, pneumatic tire consisting of the combination of: two sidewalls in spaced relation; a rim-contacting bead at the inner circumferential margin of each sidewall; reinforcing elements embedded in each of said beads throughout the circumferential length thereof; a surface-bearing member, having inner and outer peripheral surfaces, disposed transversely between and as a continuation of said sidewalls at their outer circumferential margins, said transversely disposed surface-bearing member being of great transverse width relative to the radial height of said sidewalls from bead to outer circumferential margin and forming at its inner peripheral surface a non-circular cross-sectional shape with said sidewalls; a central reinforcing member constructed integrally with and medially of said transversely disposed surface-bearing member, extending radially inward from said member to a point radially outward from said rim-contacting beads; and a plurality of reinforcing elements in spaced parallel relationship to each other embedded in and coursing throughout the circumferential length of said central reinforcing member.

3. A pneumatic tire consisting of a combination of: two sidewalls in spaced relation; a rim-contacting bead at the inner circumferential margin of each sidewall; a surface-bearing member disposed transversely between and as a continuation of said sidewalls at their outer circumferential margins, said transversely disposed surface-bearing member being extremely wide relative to the radial height of said sidewalls from bead to outer circumferential margin; a plurality of central reinforcing members constructed integrally and positioned medially of said surface-bearing member in spaced relation from said sidewalls and from each other, each of said central reinforcing members extending radially inward from said transversely disposed surface-bearing member; and a plurality of reinforcing elements in spaced parallel relationship to each other embedded in and coursing throughout the circumferential length of each of said central reinforcing members.

4. A pneumatic tire consisting of the combination of: two sidewalls in spaced relation; a rim-contacting bead at the inner circumferential margin of each sidewall; a surface-bearing member disposed transversely between and as a continuation of said sidewalls at their outer circumferential margins, said transversely disposed surface-bearing member forming a non-circular cross-sectional shape with said sidewalls; an integral central reinforcing and divider member inscribed and positioned medially on said transversely disposed surface-bearing member between said sidewalls in spaced relation therefrom and extended radially inward from said transversely disposed surface-bearing member to have its innermost radial surface disposed in the plane of the inner circumferential marginal surface of said tire beads; and one group of reinforcing elements in spaced relationship to each other embedded in and coursing throughout the circumferential length of said central reinforcing and divider member in the lower portion thereof and another group of reinforcing elements in spaced relationship to each other embedded in and coursing throughout the circumferential length of the upper portion of said central reinforcing and divider member, said reinforcing and divider member being provided with a plurality of air passage holes disposed transversely therethrough and concentrically arranged between said upper and lower portions of said central reinforcing and divider member.

5. A pneumatic tire having two sidewalls and a surface-bearing portion transversely disposed therebetween, consisting of the combination of: an integral, central reinforcing and divider member inscribed and positioned medially on the inner surface of said surface-bearing portion between said sidewalls and extended radially inward from said surface-bearing portion to have its innermost radial edge disposed in a plane slightly outward radially from the plane of the inner circumferential margin of said sidewalls; and one group of reinforcing elements in spaced parallel relationship to each other embedded in and coursing throughout the circumferential length of said central reinforcing and divider member in the lower portion thereof and another group of reinforcing elements in spaced parallel relationship to each other embedded in and coursing throughout the circumferential length of the upper portion of said central reinforcing and divider member, said reinforcing and divider member being provided with a plurality of air passages transversely disposed therethrough and concentrically arranged relative to said upper and lower portions of said member.

6. A pneumatic tire consisting of the combination of: two sidewalls in spaced relation; a rim-contacting bead at the inner circumferential margin of each sidewall; a surface-bearing member disposed transversely between and as a continuation of said sidewalls at their outer circumferential margins, said transversely disposed surface-bearing member forming a non-circular cross-sectional shape with said sidewalls; an integral central reinforcing and divider member integrally inscribed and medially positioned on said transversely disposed surface-bearing member between said sidewalls in spaced parallel relation therefrom and extended radially inward from said transversely disposed surface-bearing member, having its innermost radial surface provided with an air-sealing edge and disposed in the plane of the inner radial surface of said tire beads and being flexible medially concentric of said air-sealing edge and said surface-bearing member; and a group of reinforcing elements in spaced parallel relationship to each other embedded in and coursing throughout the circumferential length of said central reinforcing and divider member in the lower portion thereof and another group of reinforcing elements in spaced parallel relationship to each other embedded in and coursing throughout the circumferential length of the upper portion of said central reinforcing and divider member, said reinforcing and divider member being provided with a plurality of air passage holes disposed transversely therethrough and concentrically arranged between said upper and lower portions of said member.

7. A pneumatic tire having two sidewalls and a ground-bearing portion transversely disposed therebetween, consisting of the combination therewith of: a plurality of integral, central reinforcing and divider members inscribed and positioned medially on the inner surface of said ground-bearing portion, spaced apart from each other and from said sidewalls in parallel relationship and extended radially inward from said ground-bearing portion to have the innermost radial edge of each central reinforcing and divider member disposed in a plane slightly outward radially from the plane of the inner circumferential radial surface of said sidewalls; and a group of reinforcing elements in spaced parallel relationship to each other embedded in and coursing throughout the circumferential length of each of said central reinforcing and divider members in the lower portion thereof and another group of reinforcing elements in spaced parallel relationship to each other embedded in and coursing throughout the circumferential length of the upper portion of each of said reinforcing and divider members, each of said reinforcing and divider members being provided with a plurality of air passages disposed transversely therethrough and concentrically arranged relative to said upper and lower portions of each of said members.

8. In a tubeless, pneumatic tire of non-circular cross-section, open between its inner peripheral edges: a tread portion substantially wider than the height of the sidewall portions in combination with a reinforcing wall integral with the inner surface of the tread portion of the tire, medially between the sidewall portions, extending radially inward from said inner surface of the tread portion and terminating in a single undivided inner peripheral edge, the inner peripheral edges of said side walls and said reinforcing wall terminating in the same plane.

9. In a pneumatic tire consisting of the combination of: two sidewalls in spaced relation; a rim-contacting bead at the inner circumferential margin of each sidewall and a surface-bearing member disposed transversely between and as a continuation of said sidewalls at their outer circumferential margins, said transversely disposed surface-bearing member forming a non-circular cross-sectional shape with said sidewalls; and a plurality of integral, central reinforcing and divider members inscribed and positioned medially of said transversely disposed surface-bearing member in spaced parallel relation to each other and to said sidewalls and extended radially inwardly from said transversely disposed surface-bearing member, each having its innermost radial surface provided with an air-sealing edge, disposed in the plane of the inner circumferential margin of said tire beads, and a group of reinforcing elements in spaced parallel relationship to each other embedded in and coursing throughout the circumferential length of each of said central reinforcing and divider members in the lower portions thereof and another group of reinforcing elements in spaced parallel relationship to each other imbedded in and coursing throughout the circumferential length of the upper portion of each of said central reinforcing and divider members, each of said reinforcing and divider members being flexible medially concentric of said upper and lower portions and being provided with a plurality of air-passage holes therethrough concentrically and medially arranged between said upper and lower portions of each of said members.

10. In a pneumatic tire of the character described in claim 3: said transversely disposed surface-bearing member having a tread superimposed upon its outer peripheral surface, said tread consisting of a plurality of tread pattern surfaces spaced apart laterally at points radially outward from each of said central reinforcing members.

11. In a pneumatic tire of the character described in claim 4: said transversely disposed surface-bearing portion having a tread superimposed upon its outer peripheral surface, said tread consisting of two distinct tread pattern surfaces spaced apart laterally at a point radially outward from said central reinforcing member.

12. In a pneumatic tire of the character described in claim 5, said integral, central reinforcing and divider member having its innermost radial edge formed to a convexly curved cross-sectional shape.

13. In a pneumatic tire of the character described in claim 6: said transversely disposed surface-bearing portion having a tread superimposed upon its outer peripheral surface, said tread consisting of two distinct tread pattern surfaces spaced apart laterally at a point radially outward from said central reinforcing member.

14. In a pneumatic tire of the character described in claim 7, each of said integral, central reinforcing and divider members having its innermost radial edge formed to a convexly curved cross-sectional shape.

15. In a tubeless, pneumatic tire of the character described in claim 8: said reinforcing wall having embedded in its radially inward portion, coursing through its circumferential length, a plurality of reinforcing elements in spaced parallel relation to each other.

16. In a tubeless, pneumatic tire of the character described in claim 8: said reinforcing wall having embedded in the structure of its radially outer portion, coursing through its circumferential length, a plurality of reinforcing elements in spaced parallel relation to each other.

17. In a tubeless, pneumatic tire of the character described in claim 8: said reinforcing wall having a plurality of reinforcing elements embedded in its radially inner portion, coursing throughout its circumferential length, in spaced parallel relation to each other, having a plurality of reinforcing members embedded in its radially outer portion, coursing throughout its circumferential length, in spaced parallel relation to each other, having a restrictive air passage therethrough medially of said reinforcing members in said radial inner and outer portions, and having flexing qualities in its structure concentric of its said inner and outer portions to compensate for any diametric differentials between the radially inner and outer portions thereof, resulting from weight, stress or strain factors.

18. In a pneumatic tire of the character described in claim 9: a tread superimposed upon the outer peripheral surface of said surface-bearing member, said tread being a single, continuous pattern area from sidewall to sidewall.

19. In a tubeless, pneumatic tire: a tread portion substantially wider than the height of the sidewall portions; a central reinforcing wall integral with the inner surface of said tread portion, said reinforcing wall spaced medially between said sidewall portions and extending radially inward from said inner surface of said tread portion to the depth of said sidewall portions; and at least one restricting air passage hole through said central reinforcing wall.

20. A pneumatic tire consisting of the combination of: two side walls in spaced relation; a surface-bearing member disposed transversely between and as a continuation of said side walls at their outer circumferential margins, said transversely disposed surface-bearing member forming a non-circular cross-sectional shape with said side walls; an integral central reinforcing and divider member inscribed and medially positioned on said transversely disposed surface-bearing member between said side walls in spaced parallel relation therefrom and extending radially inward from said transversely disposed surface-bearing member, having its innermost radial surface provided with an air-sealing edge and disposed in the plane of the inner radial surface of said sidewalls and being flexible medially concentric of said air-sealing edge and said surface-bearing member; a reinforcing element embedded in and coursing throughout the circumferential length of said central reinforcing and divider member in the radially inner portion thereof, said reinforcing and divider member being provided with a plurality of air passage holes disposed transversely therethrough and concentrically arranged between the radially inner and outer portions of said member.

21. In a tubeless pneumatic tire of non-circular cross section, open between its inner peripheral edges: a surface-bearing portion substantially wider than the height of the sidewall portions in combination with a reinforcing wall integral with the inner surface of said surface-bearing portion, medially between the sidewall portions, extending radially inward from said inner surface of the surface-bearing portion, the inner peripheral edge of said reinforcing wall being air sealing and terminating in the same plane as the inner peripheral edges of said sidewalls.

22. In a pneumatic tubeless tire of the character described in claim 21: said reinforcing wall having embedded in its radially inward portion, coursing throughout its circumferential length, a plurality of reinforcing elements in spaced parallel relation to each other.

23. In a tubeless pneumatic tire of the character described in claim 21: said reinforcing wall having embedded in the structure of its radially outer portion, coursing through its circumferential length, a plurality of reinforcing elements in spaced parallel relation to each other.

24. In a tubeless pneumatic tire of the character described in claim 21: said reinforcing wall having a plurality of reinforcing elements embedded in its radially inner portion, coursing through its circumferential length, in spaced parallel relation to each other, having a plurality of reinforcing members embedded in its radially outer portion, coursing through its circumferential length, in spaced parallel relation to each other, having a restrictive air passage therethrough medially of the said reinforcing members in said radially inner and outer portions, and having flexing qualities in its structure concentric of its said inner and outer portions.

25. In a pneumatic tire of the character described in claim 21: said transversely disposed surface-bearing member having a tread consisting of a plurality of tread pattern surfaces spaced apart laterally imposed upon its outer peripheral surface.

References Cited in the file of this patent

UNITED STATES PATENTS

| | | |
|---|---|---|
| 1,679,444 | Pagenhart | Aug. 7, 1928 |

FOREIGN PATENTS

| | | |
|---|---|---|
| 25,863 | Great Britain | of 1904 |
| 191,394 | Switzerland | Aug. 16, 1937 |